US008804732B1

(12) United States Patent
Hepting et al.

(10) Patent No.: US 8,804,732 B1
(45) Date of Patent: Aug. 12, 2014

(54) METHODS AND APPARATUS FOR SEPARATE CONTROL AND DATA PLANES IN A WIRELESS NETWORK

(75) Inventors: Tash Hepting, Livermore, CA (US); James Reeves, Orinda, CA (US); Alireza Safari, Danville, CA (US); Ahmet Tuncay, Danville, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 445 days.

(21) Appl. No.: 13/017,801

(22) Filed: Jan. 31, 2011

Related U.S. Application Data

(60) Provisional application No. 61/299,890, filed on Jan. 29, 2010.

(51) Int. Cl.
*H04W 88/08* (2009.01)
*H04W 88/12* (2009.01)

(52) U.S. Cl.
USPC .......................................... 370/392; 370/401

(58) Field of Classification Search
None
See application file for complete search history.

(56) References Cited

U.S. PATENT DOCUMENTS

| | | | |
|---|---|---|---|
| 8,514,828 B1 * | 8/2013 | Verma et al. ................. | 370/338 |
| 2004/0047320 A1 * | 3/2004 | Eglin ............................. | 370/338 |
| 2006/0031924 A1 * | 2/2006 | Kwon et al. ..................... | 726/2 |
| 2007/0076694 A1 * | 4/2007 | Iyer et al. ..................... | 370/352 |
| 2007/0177530 A1 * | 8/2007 | Ando et al. .................... | 370/277 |
| 2007/0268918 A1 * | 11/2007 | Gopi et al. ..................... | 370/401 |
| 2008/0013474 A1 * | 1/2008 | Nagarajan et al. ............. | 370/321 |
| 2008/0155252 A1 * | 6/2008 | Nambiar ........................ | 713/153 |
| 2009/0003337 A1 * | 1/2009 | Daines et al. ................. | 370/389 |
| 2009/0067436 A1 * | 3/2009 | Gast et al. .............. | 370/395.53 |
| 2010/0290396 A1 * | 11/2010 | Karunakaran et al. ........ | 370/328 |
| 2010/0290465 A1 * | 11/2010 | Ankaiah et al. ............... | 370/390 |
| 2011/0103229 A1 * | 5/2011 | Fidler ............................ | 370/241 |

OTHER PUBLICATIONS

"Smart Mobile™: Next-Generation WLAN Architecture for High Performance Networks," A Trapeze Networks White Paper, Nov. 2006, 11 pgs.

* cited by examiner

*Primary Examiner* — Marcus R Smith
*Assistant Examiner* — Duc Duong
(74) *Attorney, Agent, or Firm* — Cooley LLP

(57) ABSTRACT

In some embodiments, an apparatus includes a wireless access point controller configured to receive information associated with a topology of a network including information associated with which access switch from a set of access switches each virtual local area network (VLAN) from a set of VLANs is associated. The wireless access point controller is configured to associate each VLAN from the set of VLANs with a unique tunnel identifier from a set of tunnel identifiers. The wireless access point controller is configured to provide each wireless access point from a set of wireless access points control information including the set of tunnel identifiers such that a wireless access point from the set of wireless access points can send a data packet received from a wireless device to an access switch from the set of access switches associated with a destination VLAN from the set of VLANs using the tunnel identifier associated with the destination VLAN.

15 Claims, 5 Drawing Sheets

METHODS AND APPARATUS FOR SEPARATE CONTROL AND DATA PLANES IN A WIRELESS NETWORK

CROSS-REFERENCE TO RELATED APPLICATION

This application claims priority to and the benefit of U.S. Provisional Patent Application Ser. No. 61/299,890, filed Jan. 29, 2010, and entitled "Split Control and Data Planes/Smart Mobile Direct-Path Forwarding," which is incorporated herein by reference in its entirety.

BACKGROUND

Some embodiments described herein relate generally to wireless networks, and, in particular, to methods and apparatus for separate control and data planes in a wireless network.

Some known wireless networks include an access point controller that functions in both a data plane and a control plane of the wireless network. In such known wireless networks, the access point controller manages the wireless access points in the wireless network. The access point controller also stores and maintains control and routing information associated with the wireless access points in the wireless network. In such known wireless networks, when a wireless access point receives data from a wireless device wirelessly connected to that wireless access point, the wireless access point sends the data to the access point controller. The access point controller then determines, using the routing information, where to forward the data. Accordingly, in such wireless networks, the access point controller both manages wireless access points and performs routing functions for data received at the wireless access points. Thus, the access point controller can be a limiting factor for both the number of wireless access points that can be part of a wireless network as well as the forwarding capacity of the wireless network.

If, for example, a wireless network includes a greater number of wireless access points than a first controller can manage, a second controller is used. Accordingly, by using a second controller, additional forwarding capacity is also added to the wireless network, even if the forwarding capacity of a single controller is sufficient for the data traffic of the wireless network. This results in unnecessary forwarding capacity being added to the wireless network. Similarly, by adding additional forwarding capacity to the wireless network (i.e., as a second controller), the number of wireless access points capable of being supported by the wireless network also increases, even if the first controller is sufficient to support the wireless access points in the wireless network. This results in unnecessary wireless access point management capacity being added to the wireless network.

Accordingly, a need exists for methods and apparatus for separating the control plane from the data plane in a wireless network. Further, a need exists for methods and apparatus that allow efficient use of resources within the wireless network, which also adds unnecessary cost to the wireless network.

SUMMARY

In some embodiments, an apparatus includes a wireless access point controller configured to receive information associated with a topology of a network including information associated with which access switch from a set of access switches each virtual local area network (VLAN) from a set of VLANs is associated. The wireless access point controller is configured to associate each VLAN from the set of VLANs with a unique tunnel identifier from a set of tunnel identifiers. The wireless access point controller is configured to provide each wireless access point from a set of wireless access points control information including the set of tunnel identifiers such that a wireless access point from the set of wireless access points can send a data packet received from a wireless device to an access switch from the set of access switches associated with a destination VLAN from the set of VLANs using the tunnel identifier associated with the destination VLAN.

DETAILED DESCRIPTION

Figure 1:
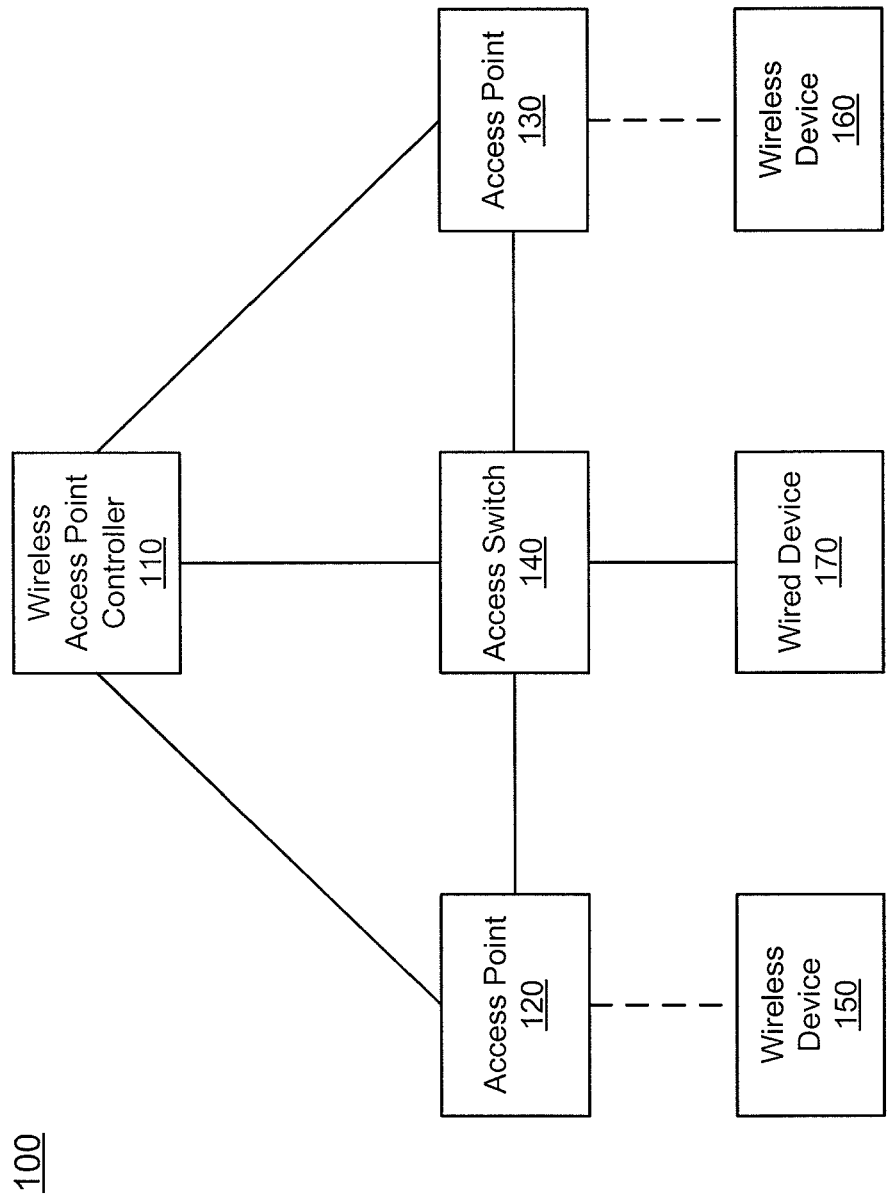
FIG. 1 is a schematic illustration of a network system, according to an embodiment.

In some embodiments, an apparatus includes a wireless access point controller configured to receive information associated with a topology of a network including information associated with which access switch from a set of access switches each virtual local area network (VLAN) from a set of VLANs is associated. The wireless access point controller is configured to associate each VLAN from the set of VLANs with a unique tunnel identifier from a set of tunnel identifiers. The wireless access point controller is configured to provide each wireless access point from a set of wireless access points control information including the set of tunnel identifiers such that a wireless access point from the set of wireless access points can send a data packet received from a wireless device to an access switch from the set of access switches associated with a destination VLAN from the set of VLANs using the tunnel identifier associated with the destination VLAN.

Using the tunnel identifier, the wireless access point can send an encapsulated data packet to the access switch without first sending the encapsulated data packet to the wireless access point controller. Accordingly, the data plane of the wireless network is separated from the wireless access point controller. Instead of using forwarding resources associated with the wireless access point controller, the wireless portion of the network can use the forwarding resources associated with a wired portion of the network. More specifically, the wireless portion of the network can use the forwarding and data plane resources associated with the access switches to forward data packets received from or sent to a wireless destination.

In some embodiments, an apparatus includes an access switch within a wired portion of a network. The access switch is configured to receive, from a wireless access point, an encapsulated data packet encapsulated by a tunnel header associated with the access switch. The access switch is configured to decapsulate the encapsulated data packet to produce a decapsulated data packet. The access switch is configured to determine a destination device for the decapsulated data packet based on a header of the decapsulated data packet. The access switch is configured to forward the decapsulated data packet to the destination device based on the header of the decapsulated data packet.

In some embodiments, a non-transitory processor-readable medium stores code that represents instructions to cause a processor to receive, from a wireless access point controller, control information associated with a network and to receive, from a wireless device, a data packet having a destination identifier associated with a destination device. The non-transitory processor-readable medium further stores code that represents instructions to cause the processor to determine, using the destination identifier and the control information, to send the data packet to an access switch from a set of access switches and to send the data packet to the access switch from the set of access switches such that the access switch forwards the data packet to the destination device.

As used herein, the term "physical hop" can include a physical link between two modules and/or devices. For example, a data path operatively coupling a first module or device with a second module or device can be said to be a physical hop. Similarly stated, a physical hop can physically link the first module or device with the second module or device.

As used herein, the term "single physical hop" can include a direct physical connection between two modules or devices in a system. Similarly stated, a single physical hop can include a link via which two modules or devices are coupled without intermediate modules and/or devices. Accordingly, for example, if a first module or device is coupled to a second module or device via a single physical hop, the first module or device can send data packets directly to the second module or device without sending the data packets through intervening modules and/or devices.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device. In some embodiments, for example, the second protocol can be a standard network protocol (e.g., Ethernet) and the first protocol can be a tunneling protocol.

As used herein, a "virtual local area network" (VLAN) can include a collection of devices grouped together to form a virtual network within a larger network. A VLAN can allow a network administrator to define a virtual network based on various parameters and/or groupings. As such, policies and/or configurations can be applied to devices within a VLAN. In some embodiments, the devices in a VLAN can operate as though they are grouped together, although they are not necessarily physically collocated. In some embodiments, a VLAN can be referred to as a network segment.

As used herein, a "tunnel" can include a data path between two devices in a network that communicate with each other using encapsulated data packets. More specifically, a first device can encapsulate a data packet described by a first protocol (e.g., a payload protocol) to define an encapsulated data packet described by a second protocol (e.g., a delivery protocol). Using the second protocol, the network can forward the encapsulated data packet to the second device. In some embodiments, tunneling can be used to securely transmit an encapsulated data packet over an unsecure network. In some embodiments, the connection between the first device and the second device can be said to be a single logical hop connection with respect to the payload protocol even though multiple physical hops can exist between the first device and the second device.

As used in this specification, the singular forms "a," "an" and "the" include plural referents unless the context clearly dictates otherwise. Thus, for example, the term "a module" is intended to mean a single module or a combination of modules.

FIG. 1 is a schematic illustration of a network system 100, according to an embodiment. The network system 100 includes a wireless access point controller 110, access point 120, access point 130 and access switch 140. Additionally, a wireless device 150 is in wireless communication with the access point 120, a wireless device 160 is in wireless communication with the access point 130, and a wired device 170 is in wired communication with the access switch 140. Accordingly, the wireless device 150, the wired device 170, and the wireless device 160 are configured to send data to and receive data from the access point 120, the access switch 140, and the access point 130, respectively. While shown in FIG. 1 as having a single wireless device 150, 160 and a single wired device operatively coupled to the access points 120, 130 and the access switch 140, respectively, in other embodiments, any number of wireless devices 150, 160 and wired devices 170 can be operatively coupled to the access points 120, 130 and the access switch 140, respectively.

As described in further detail herein, the access point 120 is operatively coupled to the access switch 140 and the wireless access point controller 110 such that the access point 120 can send data packets and control packets to and receive data packets and control packets from the access switch 140 and the wireless access point controller 110, respectively. The access point 120 can be operatively coupled to the access switch 140 and the wireless access point controller 110 using any suitable wired and/or wireless connection. In some embodiments, for example, the access point 120 is directly coupled to the access switch 140 and/or the wireless access point controller 110 via a single physical hop. In such embodiments, for example, the access point 120 can be operatively coupled to the access switch 140 and/or the wireless access point controller 110 using an Ethernet cable. In other embodiments, the access point 120 is coupled to the access switch 140 and/or the wireless access point controller 110 via intervening access switches and/or other network elements (e.g., core switches, aggregation switches, network cables, etc.). Similarly, the access point 130 is operatively coupled to the access switch 140 and the wireless access point controller 110 such that the access point 130 can send packets to and receive packets from the access switch 140 and the wireless access point controller 110. Additionally, while not shown in FIG. 1, the access points 120, 130 and the access switch 140 can be operatively coupled to any number of other network switches (e.g., access switches, aggregation switches, core switches, etc.), access points and/or other network elements to define a network.

The wireless devices 150, 160 can be any suitable wireless devices configured to be wirelessly coupled to the network system 100 via an access point 120, 130, respectively. More specifically, each of the wireless devices 150, 160 can be any device suitable for wirelessly establishing a connection with an access point 120, 130 such that the wireless device 150, 160 can send data to and receive data from the access points 120, 130. In some embodiments, each of the wireless devices 150, 160 can be, for example, a personal computing device (e.g., a desktop computer, a workstation, a laptop computer, etc.), a mobile phone, a personal digital assistant (PDA), a server, a storage device, a peripheral device, a gateway device, and/or so forth. Although not shown, in some embodiments, each of the wireless devices 150, 160 can include one or more network interface devices (e.g., a network interface card) configured to wirelessly connect the wireless devices 150, 160 to an access point 120, 130 of the network system 100.

Similarly, the wired device 170 can be any suitable wired device configured to be coupled to the access switch 140 of the network system 100. In some embodiments, for example, the wired device 170 can be, for example, a personal computing device (e.g., a desktop computer, a workstation, a laptop computer, etc.), a mobile phone, a personal digital assistant (PDA), a server, a storage device, a peripheral device, a gateway device, and/or so forth. In some embodiments, the wired device 170 can be coupled to the access switch 140 by any suitable cable (e.g., Ethernet cable), a backplane, and/or the like.

The wireless access point controller 110 is configured to manage access points 120 and 130. More specifically, the wireless access point controller 110 is configured to store and distribute control information associated with the access points 120 and 130. Such control information can include, for example, protocol information, virtual local area network (VLAN) assignment information, forwarding-state information, firewall filter information, wireless key information, and/or the like.

In some embodiments, the wireless access point controller 110 can receive and/or derive such control information based on control signals received from the access switch 140, the access points 120, 130 and/or other portions (not shown) of the network system 100. For example, the wireless access point controller 110 can receive information associated with a topology of the network system 100 and, based on the topology, derive the control information. Additionally, in some embodiments, a network administrator can provide control information to the wireless access point controller 110. Based on such an input, the wireless access point controller 110 can implement and/or distribute the control information.

Additionally, as described in further detail herein, the wireless access point controller 110 can derive and/or store tunnel identifier information associated with the access points 120, 130 and/or the access switch 140. Such tunnel identifier information can be distributed to the access points 120, 130 and/or the access switch 140 such that the access switch 140 can send data packets to and receive data packets from the access points 120, 130 using the tunnel identifiers. More specifically, the wireless access point controller 110 can assign a tunnel identifier to the access points 120, 130 and the access switch 140. Accordingly, the access point 120 can send data to the access switch 140 by encapsulating the data within a header containing the tunnel identifier of the access switch 140. Similarly, the access switch 140 can send data to the access point 120 by encapsulating the data within a header containing the tunnel identifier of the access point 120.

Figure 2:
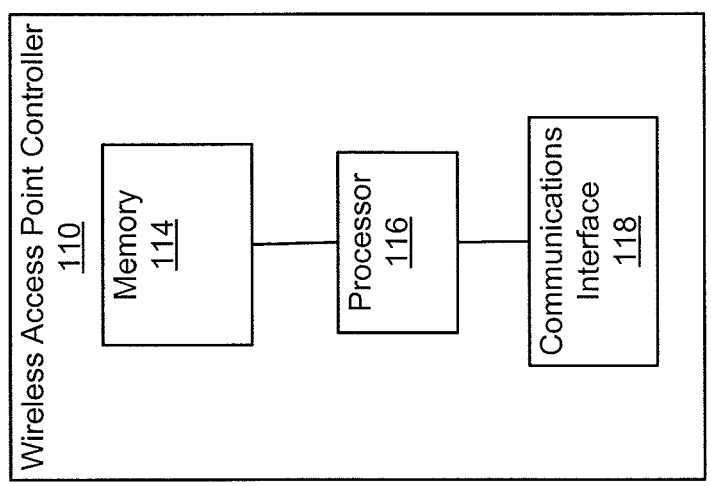
FIG. 2 is a schematic illustration of a wireless access point controller of the network system of FIG. 1.

FIG. 2 illustrates the wireless access point controller 110 of FIG. 1 in more detail. As shown in FIG. 2, the wireless access point controller 110 includes a memory 114, a processor 116, and a communications interface 118. Processor 116 can be operatively coupled to memory 114 and communications interface 118. Wireless access point controller 110 can communicate with other controllers (not shown in FIG. 1), access switch 140, and access points 120, 130 via communications interface 118. Communications interface 118 can support one or more wired and/or wireless data connections, such as connections conforming to one or more known information exchange standards, such as wired Ethernet, wireless IEEE 802.11 (Wi-Fi), high-speed packet access (HSPA), worldwide interoperability for microwave access (WiMAX), wireless local area network (WLAN), Ultra-wideband (UWB), Universal Serial Bus (USB), Bluetooth®, infrared, Code Division Multiple Access (CDMA), Time Division Multiple Access (TDMA), Global Systems for Mobile Communications (GSM), Long Term Evolution (LTE), broadband, fiber optics, telephony, and/or the like.

The memory 114 can be any suitable memory, such as, for example, a read-only memory (ROM); a random-access memory (RAM) such as, for example, a magnetic disk drive, and/or solid-state RAM such as static RAM (SRAM) or dynamic RAM (DRAM); and/or FLASH memory or a solid-data disk (SSD). In some embodiments, a memory can be a combination of memories. For example, a memory can include a DRAM cache coupled to a magnetic disk drive and an SSD. As discussed above, the memory 114 of the controller can store control information and/or tunnel identifier information associated with the access points 120, 130 and/or the access switch 140. Such information can be stored in one or more databases and/or memory portions of the memory 114.

The processor 116 can be any of a variety of processors. In some embodiments, for example, the processor 116 can be implemented as one or more hardware modules such as embedded microprocessors, microprocessors as part of a computer system, Application-Specific Integrated Circuits (ASICs), Programmable Logic Devices (PLDs), Field Programmable Gate Arrays (FPGAs), and/or the like. In some embodiments, the processor 116 can include multiple instruction executing units and/or cores.

In some embodiments, the controller 110 does not include data forwarding capability and/or is not used for data forwarding. Accordingly, the controller 110 can be said to be a control plane device that is not collocated with the data plane. As discussed in further detail herein, the forwarding capacity of the access switches can be used to forward data received from or to be sent to wireless devices. Accordingly, the data plane can be said to be separate from and/or not collocated with the control plane.

Figure 3:
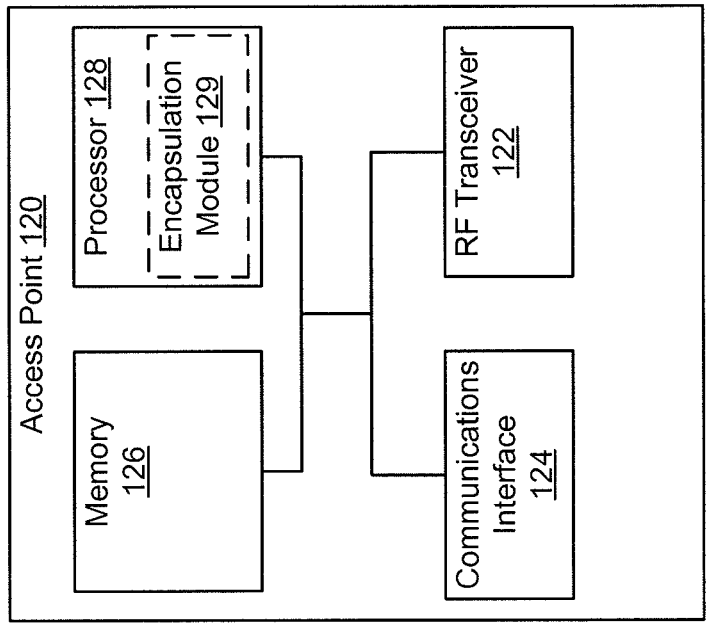
FIG. 3 is a schematic illustration of an access point of the network system of FIG. 1.

The access points 120, 130 (FIG. 1) can provide connectivity to the network system to wireless devices 150, 160. FIG. 3 illustrates the access point 120 in further detail. The access point 120 includes a memory 126, a processor 128, a communications interface 124 and a radio frequency (RF) transceiver 122. While not shown in detail, the access point 130 can be structurally and functionally similar to the access point 120.

Similar to the memory 114 shown and described with respect to FIG. 2, the memory 126 can be any suitable memory. In some embodiments, the memory can include a tunnel identifier database. Such a tunnel identifier database can store tunnel identifiers associated with access switches of the network system 100. For example, the tunnel identifier database of the access point 120 can store a tunnel identifier associated with the access switch 140. Additionally, in some embodiments and as described in further detail herein, the tunnel identifier database can associate and/or map the tunnel identifiers with a virtual local area network (VLAN) identifier. For example, if the access switch 140 has a tunnel identifier of "55" and is associated with VLAN "red", the tunnel identifier database can map and/or associate the tunnel identifier "55" with the VLAN "red". Accordingly, as described in further detail herein, if the access point 120 receives data to be sent to VLAN "red" (e.g., from wireless device 150), the access point 120 can retrieve the tunnel identifier "55" from the tunnel identifier database.

Similar to the processor 116 shown and described with respect to FIG. 2, the processor 128 can be any suitable processor. The processor 128 can be configured to control the operation of the access point 120, including the operation of the communications interface 124 and the RF transceiver 122.

In some embodiments, the processor 128 can execute an encapsulation module 129. The encapsulation module 129 can be a hardware module and/or a software module stored in the memory 126 and executed by the processor 128. The encapsulation module 129 can be configured to encapsulate a received data packet using a tunnel identifier. For example, if a received data packet is to be sent to VLAN "red", the encapsulation module 129 can encapsulate and/or wrap the data packet using the tunnel identifier "55". As described in further detail herein, the tunnel identifier "55" can be used to route the data packet to the access switch 140, associated with VLAN "red". Accordingly, a "tunnel" can be said to exist between the access point 120 and the access switch 140 even if intermediate devices (e.g., other access switches, aggregation switches, and/or core switches) between the access point 120 and the access switch 140.

Similarly, in some embodiments, the encapsulation module 129 can decapsulate and/or unwrap data packets received from the access switch 140. For example, if the access switch 140 sends a data packet to the access point 120 to be sent to the wireless device 150, the encapsulation module 129 can remove a tunnel header from the data packet (i.e., decapsulate the data packet), and send the data packet to the wireless device.

Similar to the communications interface 118, the communications interface 124 can provide an interface for communication with the wireless access point controller 110 and/or the access switch 140. In some embodiments, communications interface 124 can support one or more wired and/or wireless data connections, such as connections conforming to one or more known information exchange standards.

The RF transceiver 122 can be configured to facilitate wireless communication with one or more wireless devices (e.g., wireless device 150). More specifically, the RF transceiver 122 emits RF signals to wireless devices and receives RF signals from the wireless devices. In some embodiments, for example, the RF transceiver 122 can define an RF visibility range for the access point 120 (i.e., a physical area which an RF signal from the access point 120 covers). The access point 120 can detect when a wireless device (e.g., wireless device 150) has entered its RF range. In some embodiments, for example, the access point 120 can identify a wireless device by periodically sending a beacon signal within its RF range and receiving a response when a wireless device is within the RF range of the access point 120. After initiating a communication session with the wireless device 150, the access point 120 can send data to and receive data from the wireless device 150.

Returning to FIG. 1, the access switch 140 can be any suitable network switch configured to receive a data packet from a source device (e.g., an access point, wired device, other network switch, etc.) and forward the data packet to a destination device (e.g., an access point, wired device, other network switch, etc.). For example, the access switch 140 can be an Ethernet switch configured to forward data packets.

Figure 4:
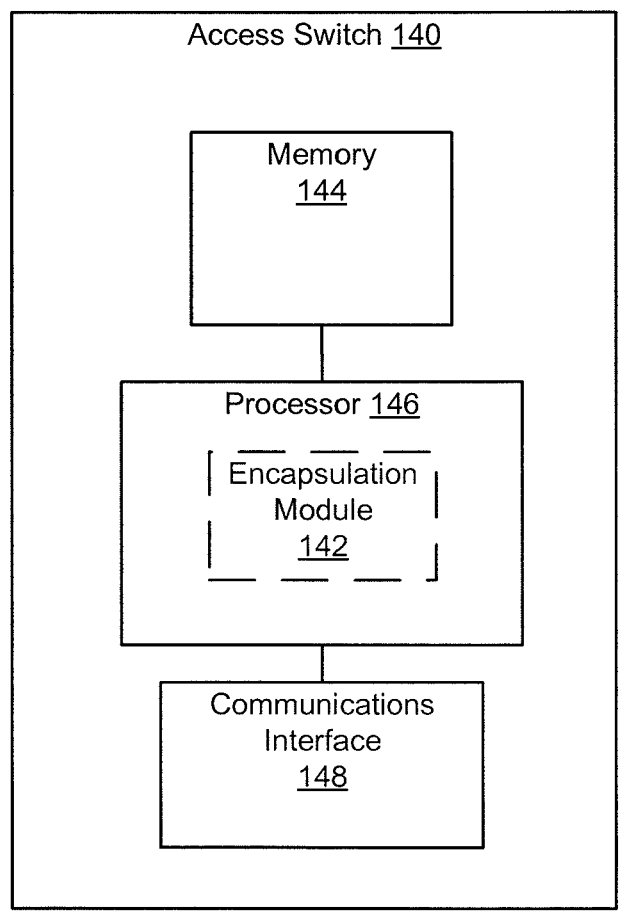
FIG. 4 is a schematic illustration of an access switch of the network system of FIG. 1.

FIG. 4 illustrates the access switch 140 in more detail. The access switch 140 includes a memory 144, a processor 146, and a communications interface 148. The memory 144, the processor 146, and the communications interface 148 can be similar to the memory 114, the processor 116, and the communications interface 118, respectively, shown and described above with respect to FIG. 2.

In some embodiments, the memory 144 of the access switch 140 can include a tunnel identifier database. Such a tunnel identifier database can store tunnel identifiers associated with access points 120, 130 and/or other access switches (not shown) of the network system 100, and associate the tunnel identifiers with destination identifiers (e.g., IP addresses, MAC addresses, and/or the like of destination wireless and/or wired devices) and/or VLAN identifiers. In some embodiments, for example, the tunnel identifier database of the access switch 140 stores the tunnel identifiers associated with the access points 120, 130, which are both associated with a common VLAN as the access switch 140. In such embodiments, the tunnel identifier database can associate the tunnel identifiers with destination devices operatively coupled to the access points 120, 130 associated with the common VLAN. In other embodiments, the tunnel identifier database can store the tunnel identifiers associated with access points associated with other VLANs as well as access points associated with the VLAN to which the access switch 140 is a member. In some embodiments and as described in further detail herein, the tunnel identifier database of the access switch 140 also associates tunnel identifiers of other access switches (not shown) with VLAN identifiers associated with those access switches.

The processor 146 can be configured to execute an encapsulation module 142. Similar to the encapsulation module 129 of the access point 120, the encapsulation module 142 can be a hardware module and/or a software module stored in the memory 144 and to be executed by the processor 146. The encapsulation module 142 can be configured to encapsulate a received data packet using a tunnel identifier. For example, if a received data packet is to be sent to access point 130, the encapsulation module 142 can encapsulate and/or wrap the data packet using a tunnel identifier associated with the access point 130. As described in further detail herein, the tunnel identifier associated with the access point 130 can be used to route the data packet to the access point 130.

Similarly, in some embodiments, the encapsulation module 142 can decapsulate and/or unwrap data packets received from other network devices (e.g., other access switches, the access points 120, 130, etc.). For example, if the access point 120 sends a data packet to the access switch 140 to be sent to the wired device 170, the encapsulation module 142 can remove the tunnel header from the data packet (i.e., decapsulate the data packet), and send the data packet to the wired device 170.

In use, the wireless access point controller 110 can assign tunnel identifiers to the access points 120, 130 and the access switch 140. As discussed above, the wireless access point controller 110 can store the tunnel identifiers in a database.

The wireless access point controller 110 can send control information (e.g., in control packets), including the tunnel identifiers, to the access points 120, 130 and the access switch 140. Each of the access points 120, 130 and the access switch 140 can store locally the tunnel identifiers received from the wireless access point controller 110. For example, the access switch 140 can store the tunnel identifiers associated with the access points 120, 130 in a database at the access switch 140.

When wireless device 150 moves within the RF range of the access point 120 and establishes a communication session with the access point 120, the wireless device 150 can send data to and receive data from the access point 120. For example, the wireless device 150 can send a data packet to the access point 120 to be delivered to the wired device 170.

The access point 120 can receive the data packet and determine, based on header information within the data packet, that the data packet is to be sent to the access switch 140. More specifically, the access switch 140 can be part of a VLAN associated with the wired device 170. Based on a destination identifier (e.g., a media access control (MAC) address, an interne protocol (IP) address, or other address associated with the wired device 170) within the data packet header, the access point 120 can determine with which VLAN the wired device 170 is associated and thus, determine, based on the VLAN information, to which access switch 140 (associated with the same VLAN) to send the encapsulated data packet.

The processor 128 of the access point 120 can query the tunnel identifier database within the memory 126 of the access point 120 to retrieve a tunnel header value associated with the access switch 140. Using the tunnel header value associated with the access switch 140, the encapsulation module 129 (FIG. 3) can encapsulate and/or wrap the data packet. Accordingly, the tunnel header value can be appended to the data packet. The access point 120 can then send, via the communications interface 124, the data packet to the access switch 140.

The network system 100 (including any intervening access switches, aggregation switches and/or core switches between the access point 120 and the access switch 140) can forward the encapsulated data packet to the access switch 140, using the tunnel header value. By using the tunnel header value, any intervening switches and/or devices between the access point 120 and the access switch 140 do not decapsulate and/or classify the data packet prior to sending the data packet to a next physical hop. Thus, the data path and/or tunnel between the access point 120 and the access switch 140 can be referred to as a single logical hop even though multiple physical hops can exist between the access point 120 and the access switch 140 (e.g., between other access switches, aggregation switches and/or core switches).

After the encapsulated data packet is received at the access switch 140, the encapsulation module 142 (FIG. 4) of the access switch 140 can decapsulate and/or unwrap the data packet. More specifically, the encapsulation module 142 can remove the tunnel header value from the encapsulated data packet to produce a decapsulated data packet. Using the destination identifier within the data packet header, the access switch 140 can send the data packet to the wired device 170.

For another example, the wireless device 150 can send a data packet to the access point 120 to be delivered to the wireless device 160. The access point 120 can receive the data packet and determine, based on header information within the data packet, that the data packet is to be sent to the access switch 140. More specifically, the access switch 140 can be part of a VLAN associated with the wireless device 160 and/or the access point 130. Based on a destination identifier (e.g., a MAC address, an IP address, or other address associated with the wireless device 160) within the data packet header, the access point 120 can determine with which VLAN the wireless device 160 is associated and thus, using a VLAN identifier associated with the VLAN with which the wireless device 160 is associated, determine to send the data packet to access switch 140 based on the VLAN information.

Specifically, the access point 120 can query the tunnel identifier database at the access point 120 to retrieve a tunnel header value associated with the access switch 140 based on the VLAN identifier. Using the tunnel header value associated with the access switch 140, the encapsulation module 129 (FIG. 3) can encapsulate and/or wrap the data packet. The access point 120 can then send, via the communications interface 124, the encapsulated data packet to the access switch 140.

After the encapsulated data packet is received at the access switch 140, the encapsulation module 142 (FIG. 4) of the access switch 140 can decapsulate and/or unwrap the encapsulated data packet. Using the destination identifier within the data packet header, the access switch 140 can query the tunnel identifier database at the access switch 140 to determine to which access point 130 to send the data packet. More specifically, a tunnel header value associated with the access point 130 can be retrieved from the tunnel identifier database using the destination identifier within the data packet header.

The encapsulation module 142 of the access switch 140 can encapsulate the data packet using the tunnel header value associated with the access point 130, and send the encapsulated data packet to the access point 130. Similar to the data path and/or tunnel between the access point 120 and the access switch 140, the data path and/or tunnel between the access switch 140 and the access point 130 can include one or more physical hops (e.g., through intervening access switches, aggregation switches and/or core switches), over a single logical hop.

The encapsulation module of the access point 130 can decapsulate the data packet and send the data packet to the wireless device 160 based on the destination identifier within the data packet header. Accordingly, using the network system 100, the access point 120 can send encapsulated data packets to the access switch 140 and the access point 130, without sending the data packet through the wireless access point controller 110.

Figure 5:
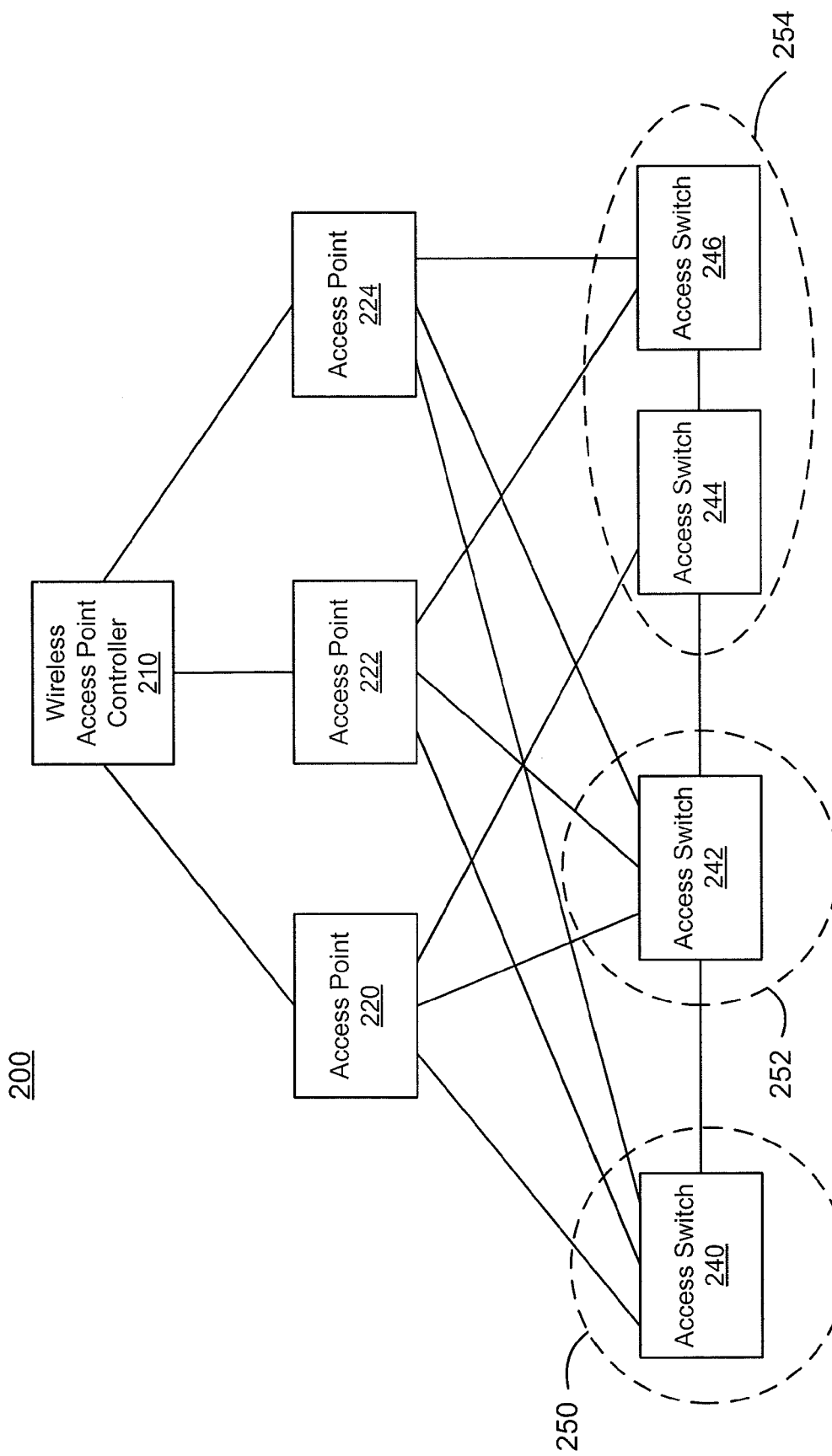
FIG. 5 is a schematic illustration of a network system, according to another embodiment.

FIG. 5 is a schematic illustration of a network system 200, according to another embodiment. The network system 200 includes a wireless access point controller 210, multiple access points 220, 222, 224, and multiple access switches 240, 242, 244, 246. The wireless access point controller 210, the access points 220, 222, 224, and the access switches 240, 242, 244, 246 can be structurally and functionally similar to the wireless access point controller 110, the access points 120, 130 and the access switch 140 shown and described with respect to FIGS. 1-4, respectively. Accordingly, one or more wired devices can be operatively coupled to each access switch 240, 242, 244, 246 and one or more wireless devices can be operatively coupled to each access point 220, 222, 224.

Each of the access switches 240, 242, 244, 246 is associated with a virtual local area network (VLAN) 250, 252, 254. For example, the access switch 240 is associated with the VLAN 250, the access switch 242 is associated with the VLAN 252, and the access switches 244 and 246 are associated with the VLAN 254. While not shown in FIG. 5, other devices (e.g., wired devices, wireless devices, etc.) and/or access points 220, 222, 224 can also be associated with a VLAN 250, 252, 254. Additionally, in some embodiments, an access switch can be associated with more than a single VLAN.

Each access point 220, 222, 224 is operatively coupled to the wireless access point controller 210. Accordingly, each access point 220, 222, 224 can send configuration information to and receive configuration information from the wireless access point controller 210. For example, each access point 220, 222, 224 can receive tunnel identifier information associated with each of the access switches 240, 242, 244, 246.

In some embodiments, each access switch 240, 242, 244, 246 is also operatively coupled to the wireless access point controller 210. In some embodiments, for example, each access switch 240, 242, 244, 246 is operatively coupled to the wireless access point controller 110 via at least one access point 220, 222, 224. Accordingly, in such embodiments, each access switch 240, 242, 244, 246 can receive tunnel identifier information associated with the access points 220, 222, 224 from the access points 220, 222, 224. For example, in some embodiments, each access point 220, 222, 224 can provide its tunnel identifier information to one or more access switches 240, 242, 244, 246 associated with a common VLAN as that access point 220, 222, 224. In other embodiments, the wireless access point controller 210 can provide tunnel identifier information directly to the access switches 240, 242, 244, 246 (e.g., not through the access points 220, 222, 224). In still other embodiments, only some of the access switches 240, 242, 244, 246 are directly coupled to the wireless access point controller 210. In such embodiments, the access switches directly coupled to the wireless access point controller 210 receive the tunnel identifier information directly from the wireless access point controller 210. The access switches not directly coupled to the wireless access point controller 210 can receive the tunnel identifier information from the access switches directly coupled to the wireless access point controller 210 or the access points 220, 222, 224.

Additionally, each access point 220, 222, 224 is operatively coupled to at least one access switch 240, 242, 244, 246 associated with each VLAN 250, 252, 254. For example, access point 220 is operatively coupled (e.g., either directly or through one or more other access switches, aggregation switches and/or core switches) to access switch 240 (associated with VLAN 250), access switch 242 (associated with VLAN 252), and access switch 244 (associated with VLAN 254). Similarly, access points 222 and 224 are operatively coupled to access switch 240 (associated with VLAN 250), access switch 242 (associated with VLAN 252), and access switch 246 (associated with VLAN 254). Additionally, each access switch 240, 242, 244, 246 is operatively coupled to the other access switches 240, 242, 244, 246 (either directly or through one or more other access switches, aggregation switches and/or core switches) to form network 200.

As discussed above with respect to FIGS. 1-4, the controller 210 can assign tunnel identifiers to each of the access points 220, 222, 224 and each of the access switches 240, 242, 244, 246. Such tunnel identifiers can be distributed to the access points 220, 222, 224 and the access switches 240, 242, 244, 246. In some embodiments, each access point 220, 222, 224 can store the tunnel identifiers of the access switches 240, 242, 244, 246 along with VLAN identifiers in a tunnel identifier database. For example, the tunnel identifier database of the access point 220 can associate a tunnel identifier of the access switch 240 with an identifier of the VLAN 250, a tunnel identifier of the access switch 242 with an identifier of the VLAN 252, and a tunnel identifier of the access switch 244 with an identifier of the VLAN 254. Similarly, the tunnel identifier database of the access point 222 and the tunnel identifier database of the access point 224 can each associate a tunnel identifier of the access switch 240 with an identifier of the VLAN 250, a tunnel identifier of the access switch 242 with an identifier of the VLAN 252, and a tunnel identifier of the access switch 246 with an identifier of the VLAN 254.

Similarly, in some embodiments, as discussed above, each of the access switches 240, 242, 244, 246 can store a tunnel identifier database that associates a tunnel identifier of each access point 220, 222, 224 with identifiers (e.g., MAC addresses, IP addresses, and/or the like) of the wireless devices operatively coupled to the access points 220, 222, 224. In some embodiments, the tunnel identifier database of each access switch 240, 242, 244, 246 also associates tunnel identifiers of remaining access switches 240, 242, 244, 246 with VLAN identifiers associated with those remaining access switches 240, 242, 244, 246. Accordingly, using tunnel identifiers, each access switch 240, 242, 244, 246 can send data packets to the other access switches 240, 242, 244, 246.

In use, a wireless device operatively coupled to an access point 220, 222, 224 can send a data packet to a wireless device operatively coupled to another access point 220, 222, 224 and/or to a wired device operatively coupled to an access switch 240, 242, 244, 246. For example, a wireless device operatively coupled to the access point 220 can send a data packet to the access point 220 to be forwarded to a wired device associated with VLAN 252. The access point 220 can receive the data packet and, based on a destination identifier associated with the destination device (i.e., the wired device associated with VLAN 252), the access point 220 can determine (e.g., using a lookup table that associates VLANs with destination identifiers) that the destination device is associated with VLAN 252. The access point 220 can query its tunnel identifier database, using a VLAN identifier associated with VLAN 252, to retrieve a tunnel identifier associated with an access switch 242 associated with that VLAN 252.

The encapsulation module (not shown) of the access point 220 can encapsulate the data packet using the tunnel identifier associated with the access switch 242. The access point 220 can then send, via a communications interface (not shown), the encapsulated data packet to the access switch 242. The portion of network system 200 (including any intervening access switches, aggregation switches and/or core switches) between the access point 220 and the access switch 242 can forward the encapsulated data packet to the access switch 242, using the tunnel header value. As discussed above, the data path and/or tunnel between the access point 220 and the access switch 242 can be a single logical hop having one or more physical hops.

After the encapsulated data packet is received at the access switch 242, the encapsulation module (not shown) of the access switch 242 can decapsulate and/or unwrap the data packet. More specifically, the encapsulation module can remove the tunnel header value from the data packet. Using the destination identifier within the decapsulated data packet header, the access switch 242 can send the decapsulated data packet to the destination device associated with VLAN 252 (and associated with access switch 242).

For another example, a wireless device operatively coupled to the access point 220 can send a data packet to the access point 220 to be forwarded to a wireless device operatively coupled to access point 224 and associated with VLAN 254. The access point 220 can receive the data packet and, based on a destination identifier associated with the destination device (i.e., the wireless device operatively coupled to access point 224), the access point 220 can determine (e.g., using a lookup table) that the destination device is associated with VLAN 254. The access point 220 can query its tunnel identifier database, using a VLAN identifier associated with VLAN 254, to retrieve a tunnel identifier associated with an access switch 244 associated with that VLAN 254.

The encapsulation module (not shown) of the access point 220 can encapsulate the data packet using the tunnel identifier associated with the access switch 244. The access point 220 can then send, via a communications interface (not shown), the encapsulated data packet to the access switch 244. The network system 200 (including any intervening access switches, aggregation switches and/or core switches) can forward the encapsulated data packet to the access switch 244, using the tunnel header value.

After the encapsulated data packet is received at the access switch 244, the encapsulation module (not shown) of the access switch 244 can decapsulate and/or unwrap the data packet. More specifically, the encapsulation module can remove the tunnel header value from the data packet. Using the destination identifier within the data packet header, the access switch 244 can determine, using a destination identifier of the destination device to query the tunnel identifier database at the access switch 244, a tunnel identifier of the access point 224 to which the destination device is operatively coupled.

The encapsulation module (not shown) of the access switch 244 can encapsulate the data packet using the tunnel identifier associated with the access point 224. The access switch 244 can then send, via a communications interface (not shown), the encapsulated data packet to the access point 224 (e.g., through intervening access switches such as access switch 246, aggregation switches and/or core switches). The network system 200 (including any intervening access switches, aggregation switches and/or core switches) can forward the encapsulated data packet to the access point 224, using the tunnel header value of the access point 224.

After the encapsulated data packet is received at the access point 224, the encapsulation module (not shown) of the access point 224 can decapsulate and/or unwrap the data packet. More specifically, the encapsulation module can remove the tunnel header value from the data packet. Using the destination identifier within the data packet header, the access point 224 can send the decapsulated data packet to the destination device operatively coupled to the access point 224 and associated with VLAN 254.

For yet another example, a wired device operatively coupled to the access switch 240 can send a data packet to the access switch 240 to be forwarded to a wireless device operatively coupled to access point 222 and associated with VLAN 252. The access switch 240 can receive the data packet and, based on a destination identifier associated with the destination device (i.e., the wireless device operatively coupled to access point 222), the access switch 240 can determine (e.g., using a lookup table) that the destination device is associated with a specific VLAN (e.g., VLAN 252).

In some embodiments, the access switch 240 can query its tunnel identifier database, using a VLAN identifier associated with VLAN 252, to retrieve a tunnel identifier associated with an access switch 242 associated with that VLAN 252. In such embodiments, the encapsulation module (not shown) of the access switch 240 can encapsulate the data packet using the tunnel identifier associated with the access switch 242. The access switch 240 can then send, via a communications interface (not shown), the encapsulated data packet to the access switch 242. The network system 200 (including any intervening access switches, aggregation switches and/or core switches) can forward the encapsulated data packet to the access switch 242, using the tunnel header value. After the encapsulated data packet is received at the access switch 242, the encapsulation module (not shown) of the access switch 242 can decapsulate and/or unwrap the data packet. More specifically, the encapsulation module can remove the tunnel header value from the data packet.

In other embodiments, the access switch 240 can send the data packet to the access switch 242 without encapsulating the data packet. In such embodiments, the data packet can be forwarded through the network system 200 similar to a data packet to be sent through the network system 200 to a wired device. More specifically, the network system 200 (including any access switches, aggregation switches and core switches) can forward the data packet to the access switch 242 based on one or more header values in the data packet.

Using the destination identifier within the data packet header, the access switch 242 can determine, using a destination identifier of the destination device to query the tunnel identifier database at the access switch 242, a tunnel identifier of the access point 222 to which the destination device is operatively coupled.

The encapsulation module (not shown) of the access switch 242 can encapsulate the data packet using the tunnel identifier associated with the access point 222. The access switch 242 can then send, via a communications interface (not shown), the encapsulated data packet to the access point 222. The network system 200 (including any intervening access switches, aggregation switches and/or core switches) can forward the encapsulated data packet to the access point 222, using the tunnel header value of the access point 222.

After the encapsulated data packet is received at the access point 222, the encapsulation module (not shown) of the access point 222 can decapsulate and/or unwrap the data packet. More specifically, the encapsulation module can remove the tunnel header value from the data packet. Using the destination identifier within the data packet header, the access point 222 can send the data packet to the destination device operatively coupled to the access point 222 and associated with VLAN 252.

Figure 6:
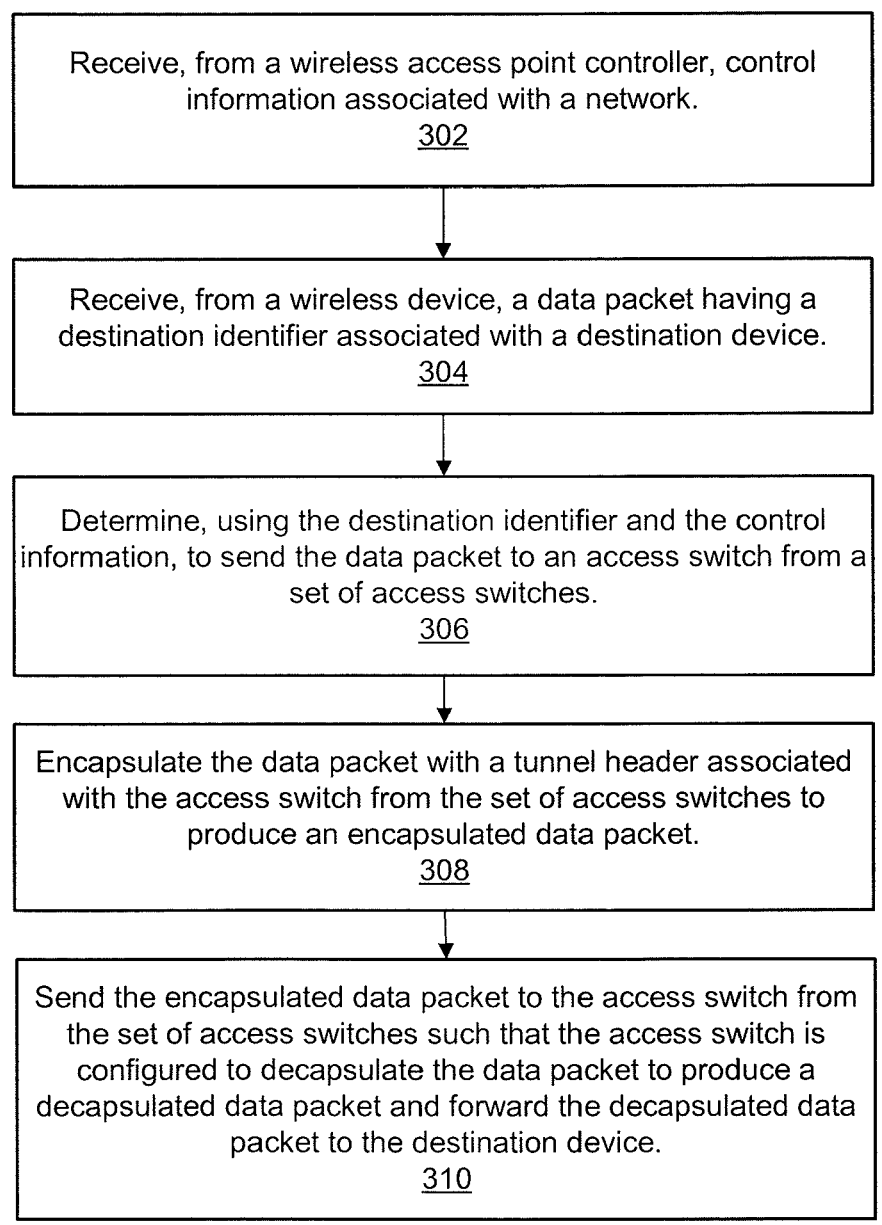
FIG. 6 is a flow chart illustrating a method of forwarding data within a network system, according to another embodiment.

FIG. 6 is a flow chart illustrating a method 300 of forwarding data within a network system, according to another embodiment. The method 300 includes receiving, from a wireless access point controller, control information associated with a network, at 302. In some embodiments and as described above, the control information includes tunnel identifiers associated with wireless access points and/or access switches within the network. In some embodiments, a wireless access point can store the tunnel identifiers in a tunnel identifier database that associates the tunnel identifiers with access switches.

A data packet having a destination identifier associated with a destination device is received, at 304. The destination device can be a wireless device or a wired device operatively coupled to an access point of an access switch of the network. In some embodiments, the destination identifier can be an IP address, a MAC address and/or the like associated with the destination device.

The method 300 further includes determining, using the destination identifier and the control information, to send the data packet to an access switch from a set of access switches, at 306. In some embodiments, for example, a lookup table is queried to determine with which VLAN the destination device is associated. Using a VLAN identifier associated with that VLAN, the tunnel identifier database can be queried to retrieve a tunnel identifier associated with that VLAN. The tunnel identifier can identify the access switch.

The data packet is encapsulated with a tunnel header associated with the access switch from the set of access switches to produce an encapsulated data packet, at 308. The encapsulated data packet is sent to the access switch from the set of access switches such that the access switch is configured to decapsulate the data packet to produce a decapsulated data packet and forward the decapsulated data packet to the destination device, at 310.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

While shown and described above as being directly coupled to every access point, in some embodiments, a wireless access point controller can be coupled to fewer than all of the access points. In such embodiments, for example, the wireless access point controller can provide control information to the access points to which it is not directly coupled, via the access points and/or access switches to which it is directly coupled. Similarly, in some embodiments, any number of the access switches in a network system can be directly and/or indirectly (e.g., through other access switches and/or access points) coupled to the wireless access point controller.

While shown and described above as being included within an access switch, in some embodiments, an encapsulation module can be part of an interface that can be coupled, attached to and/or loaded onto an access switch. In such embodiments, a generic access switch can be modified (using the interface) to include the encapsulation functionality of the encapsulation module. Accordingly, existing wired access switches can be modified to interface with the access points shown and described above.

In some embodiments, tunnels between devices (e.g., between access points and access switches) can pass through and/or include a portion of any intervening module and/or device within a network system. In some embodiments, for example, the tunnels can pass through access switches, aggregation switches and/or core switches. In other embodiments, the tunnels do not pass through the core switches. In still other embodiments, a tunnel can be a direct link between the devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a wireless access point controller configured to receive information associated with a topology of a network including information associated with which access switch from a plurality of access switches each virtual local area network (VLAN) from a plurality of VLANs is associated, the wireless access point controller configured to associate each VLAN from the plurality of VLANs with a unique tunnel identifier from a plurality of tunnel identifiers,
the wireless access point controller configured to provide each wireless access point from a plurality of wireless access points a first control information including the plurality of tunnel identifiers such that a first wireless access point from the plurality of wireless access points can send a data packet received from a wireless device to an access switch from the plurality of access switches associated with a destination VLAN from the plurality of VLANs using the unique tunnel identifier associated with the destination VLAN,
the wireless access point controller configured to provide a second control information to each access switch from the plurality of access switches such that the access switch from the plurality of access switches encapsulates the data packet, using the second control information, prior to forwarding the data packet to a second wireless access point from the plurality of wireless access points and associated with a destination device.

2. The apparatus of claim 1, wherein the wireless access point controller is configured to provide each wireless access point from the plurality of wireless access points the first control information such that the first wireless access point from the plurality of wireless access points can send the data packet to the access switch from the plurality of access switches without sending the data packet to the wireless access point controller.

3. The apparatus of claim 1, wherein the wireless access point controller does not receive data packets from the plurality of wireless access points.

4. The apparatus of claim 1, wherein the access switch from the plurality of access switches is physically collocated with the second wireless access point.

5. An apparatus, comprising:
an access switch within a wired portion of a network, the access switch configured to receive, from a first wireless access point, a first encapsulated data packet encapsulated by a tunnel header associated with the first wireless access point, the access switch configured to decapsulate the first encapsulated data packet to produce a first decapsulated data packet, the access switch configured to determine a destination device for the first decapsulated data packet based on a header of the first decapsulated data packet, the access switch configured to forward the first decapsulated data packet to the destination device based on the header of the first decapsulated data packet, the access switch being configured to send the decapsulated data packet to the destination device without encapsulating the decapsulated data packet when the destination device is within the wired portion of the network, the access switch configured to encapsulate the first decapsulated data packet with a tunnel header associated with a second wireless access point to which the destination device is operatively coupled to produce a second encapsulated data packet when the destination device is within a wireless portion of the network, the access switch configured to encapsulate the first decapsulated data packet based on the header of the data packet and prior to forwarding the first decapsulated data packet to the destination device via the second wireless access point when the destination device is within the wireless portion of the network.

6. The apparatus of claim 5, wherein the access switch is configured to receive control information associated with the first wireless access point from a wireless access point controller.

7. The apparatus of claim 5, wherein the access switch is associated with a virtual local area network (VLAN), the tunnel header being associated with the VLAN.

8. The apparatus of claim 5, wherein the first wireless access point is from a plurality of wireless access points, the tunnel header associated with the first wireless access point is from a plurality of tunnel headers, the access switch configured to store a database that associates each tunnel header from the plurality of tunnel headers with a wireless access point from the plurality of wireless access points.

9. A non-transitory processor-readable medium storing code representing instructions to cause a processor to:

receive, from a wireless access point controller, first control information associated with a network and second control information associated with the network;

receive, from a wireless device, a data packet having a destination identifier associated with a destination device;

determine, using the destination identifier and the first control information, to send the data packet to a first access switch from a plurality of access switches;

encapsulate the data packet with a tunnel header associated with the first access switch from the plurality of access switches to produce a first encapsulated data packet; and send the first encapsulated data packet to the first access switch from the plurality of access switches such that the first access switch decapsulates the first encapsulated data packet to produce a first decapsulated data packet prior to forwarding the first decapsulated data packet to the destination device;

determine, using the destination identifier and the second control information, to send the data packet to a second access switch from a plurality of access switches;

encapsulate the data packet with a tunnel header associated with the second access switch to produce a second encapsulated data packet; and send the second encapsulated data packet to the second access switch such that the second access switch decapsulates the second encapsulated data packet to produce a second decapsulated data packet prior to forwarding the second decapsulated data packet to the destination device.

10. The non-transitory processor-readable medium of claim 9, wherein the destination device is associated with a virtual local area network (VLAN), the first access switch being associated with the VLAN.

11. The non-transitory processor-readable medium of claim 9, wherein the first control information includes a virtual local area network (VLAN) identifier for at least one access switch from the plurality of access switches.

12. The non-transitory processor-readable medium of claim 9, wherein the first control information includes a tunnel identifier for at least one access switch from the plurality of access switches.

13. The non-transitory processor-readable medium of claim 9, wherein the code representing instructions to cause the processor to send the first encapsulated data packet to the first access switch includes code representing instructions to cause the processor to send the first encapsulated data packet to the first access switch using the tunnel header associated with the first access switch.

14. The non-transitory processor-readable medium of claim 9, wherein the code representing instructions to cause the processor to send the first encapsulated data packet includes code representing instructions to cause the processor to send the first encapsulated data packet to the first access switch from the plurality of access switches without sending the data packet to the wireless access point controller.

15. The non-transitory processor-readable medium of claim 9, further comprising code representing instructions to cause the processor to:

store the first control information, including a plurality of virtual local area network (VLAN) identifiers and a plurality of tunnel identifiers associated with the plurality of access switches, in a database at a wireless access point.

* * * * *